United States Patent [19]
Tait et al.

[11] 4,175,054
[45] Nov. 20, 1979

[54] USE OF HYDROCARBON POLYMERS IN DEMULSIFICATION

[75] Inventors: William S. Tait, Saint Louis; Roy W. Greenlee, Ballwin, both of Mo.

[73] Assignee: Petrolite Corporation, St. Louis, Mo.

[21] Appl. No.: 741,150

[22] Filed: Nov. 11, 1976

[51] Int. Cl.² ............................................. B01D 17/04
[52] U.S. Cl. ..................................... 252/331; 252/358
[58] Field of Search ................................ 252/331, 358

[56] References Cited
U.S. PATENT DOCUMENTS

| 2,542,147 | 2/1951 | Krewer et al. | 252/331 X |
| 2,543,489 | 2/1951 | DeGroote et al. | 252/331 |
| 2,557,081 | 6/1951 | DeGroote et al. | 252/331 |
| 3,557,017 | 1/1971 | Mange et al. | 252/358 X |

Primary Examiner—Richard D. Lovering
Attorney, Agent, or Firm—Sidney B. Ring; Hyman F. Glass

[57] ABSTRACT

This invention relates to the use of hydrocarbon polymers or copolymers in conjunction with demulsifiers in demulsification. The use of said hydrocarbon polymers-demulsifier combination is more effective in demulsification than is achieved by the use of the demulsifier alone. The process is particularly effective in desalting oils.

11 Claims, No Drawings

USE OF HYDROCARBON POLYMERS IN DEMULSIFICATION

This invention relates to the treatment of emulsions and more particularly to the resolution of emulsions in which the external phase is an oil and the dispersed phase is a liquid or semi-liquid sufficiently immiscible with the oil to exist therein in the form of dispersed droplets. The oil phase of such an emulsion may be any vegetable, animal or mineral oil, or products obtained therefrom. The invention will be exemplified with reference to petroleum emulsions in which the external phase is crude oil or distillation products derived therefrom and whether or not containing a solvent or diluent. The internal or dispersed phase may be any liquid sufficiently immiscible with the external-phase material to exist therein as dispersed droplets. By way of example, the invention will be specifically described with reference to the dehydration or desalting of crude oil emulsions of the water-in-oil type in which the dispersed phase is an aqueous medium, typically droplets of relatively fresh water or brine or both, the term "water" being used in the broad sense to cover these or other aqueous media.

Crude oil emulsions are commonly produced by oil wells due to the mixture of water with the oil entering the well, such emulsions being often referred to as "natural" emulsions. They must necessarily be broken and the water separated therefrom before the oil is suitable for further processing by the conventional refining methods. Our process is applicable to such "natural" emulsions, and it is an object of this invention to provide a process for effectively resolving such emulsions and other emulsions of the oil-continuous type which will not readily separate on standing.

Many of the waters which are found in these "natural" emulsions have high salt contents and are often called "brines" for that reason. The commercial dehydrating procedures usually are unable to remove every trace of such brines, producing so-called pipe-line oils containing from a fraction of a percent up to no more than a few percent of residual brine. However, this residual brine carries an objectionable amount of corrosive and otherwise deleterious salts, harmful to the refining steps and to the products resulting therefrom.

To reduce the quantity of such salts, the pipe-line oil is often subjected, usually at the refinery, to a desalting operation in which relatively fresh water is mixed with the oil to combine with the residual brine at some stage in the process, the aqueous material being then separated to leave a desalted oil. Emulsions thus made for desalting purposes are referred to as "artificial" emulsions and our process is applicable to them. It is an object of this invention to provide a process for efficiently removing the salt from a pipe-line oil or refinery charging stock before subjection to refinery processing.

Due to the stabilizing agents present in crude oils, both the "natural" and "artificial" emulsions are usually so stable that they cannot be resolved effectively at reasonable temperatures except by use of auxiliary equipment or chemicals. The present invention is concerned, in one of its important aspects, with the treatment of such emulsions by use of chemical demulsifying agents, alone or in conjunction with other aids such as centrifugation, high voltage electric field, etc. Many such demulsifying compounds are known in the art.

Generally speaking, the desalting process is divisible into three distinct operations, viz., (1) dispersion, (2) coalescence and (3) phase separation.

The dispersing step of the desalting process involves mixing a stream of the oil to be desalted and a stream of relatively fresh water, e.g., a water low in salt content relative to the salt content of the residual brine in the oil. The amount of the relatively fresh water is usually about 3% to 10% by volume of the oil. A small amount of a chemical demulsifying agent is mixed with the oil, the water, or the resulting emulsion. Additionally, heat may be applied to the streams of the oil, the water, or the emulsion.

The coalescing step provides an opportunity for contact between the dispersed droplets of the emulsion produced by the dispersing step, e.g., a coalescence of brine droplets and/or a coalescence of droplets of relatively fresh water and brine droplets of the "artificial" emulsion in such a way that contact is achieved without further subdividing the dispersed droplets and while inducing coalescence to a size to separate in the later settling step. Here the emulsion enters a quiescent zone to permit the coalesced water masses to settle through the oil and to separate as a distinct phase of salty water in the lower section. The supernatant desalted oil is taken overhead to the still or to other refinery equipment either directly or with the aid of additional pressuring means.

The completeness of the phase separation is determined by a number of factors, chief of which are the amount and kind of chemical demulsifying agent, if such is used; the character of the crude oil to be desalted; the temperatures of operation; the efficiency of the settling device used; and the effectiveness of the coalescing action employed to enhance resolution of the emulsion.

With some emulsions, the droplets are sufficiently unstable to coalesce with each other upon contact, even in the absence of an added chemical demulsifying agent. However, with emulsions in which the dispersed droplets are more stable, it is desirable that a small amount of a chemical demulsifying agent be present in the annular space. This is particularly true as concerns emulsions in which the dispersed phase is finely divided, since it is known that the smaller the particle size the greater the stability of the emulsion. The chemical demulsifier serves to destabilize the particles or droplets so that the probability of coalescence upon contact, as provided by the controlled turbulence coalescer, is much greater than without the chemical.

Various chemical demulsifying agents differ in their ability to decrease the stability of oil-continuous emulsions, as is known in the art. Among those most effective in the treatment of crude oil emulsions are agents of the type described in U.S. Pat. Nos. 2,154,423; 2,498,656; and 2,499,360. However, the invention is not limited to the particular type of chemical demulsifying agent. In general, demulsifying chemicals currently used in the art of chemical dehydration and desalting operations are well suited for use in our process.

The chemical demulsifier employed herein is a surfactant capable of acting as a demulsifier in the particular system to be treated. The surfactants most usually employed in the practice of this invention are generally known as oxyalkylated surfactants or more specifically polyalkylene ether or polyoxyalkylene surfactants. Oxyalkylated surfactants as a class are well known. The possible sub-classes and specific species are legion. The methods employed for the preparation of such oxyalkylated surfactants are also too well known to require much elaboration. Most of these surfactants contain, in at least one place in the molecule and often in several places, an alkanol or a polyglycolether chain. These are most commonly derived by reacting a starting molecule, possessing one or more oxyalkylatable reactive groups, with an alkylene oxide such as ethylene oxide, propylene oxide, butylene oxide, or higher oxides, epichlorohydrin, etc. However, they may be obtained by other methods such as shown in U.S. Pat. Nos. 2,588,771 and 2,596,091-3, or by esterification or amidification with an oxyalkylated material, etc. Mixtures of oxides may be used as well as successive additions of the same or different oxides may be employed. Any oxyalkylatable material may be employed. As typical starting materials may be mentioned alkyl phenols, phenolic resins, alcohols, glycols, amines, organic acids, carbohydrates, mercaptans, and partial esters of polybasic acids. In general, the art teaches that, if the starting material is water-soluble, it may be converted into an oil-soluble surfactant by the addition of polypropoxy or polybutoxy chains. If the starting material is oil-soluble, it may be converted into a water-soluble surfactant by the addition of polyethoxy chains. Subsequent additions of ethoxy units to the chains tend to increase the water solubility, while, subsequent additions of high alkoxy chains tend to increase the oil solubility. In general, the final solubility and surfactant properties are a result of a balance between the oil-soluble and water-soluble portions of the molecule.

In general, the surfactants are oxyalkylated surfactants of the general formula $$Z[(OR)_n OH]_m$$

wherein Z is the oxyalkylatable material, R is the radical derived from the alkylene oxide which can be, for example, ethylene, propylene, butylene, epichlorohydrin and the like, n is a number determined by the moles of alkylene oxide reacted, for example 1 to 2000 or more and m is a whole number determined by the number of reactive oxyalkylatable groups. Where only one group is oxyalkylatable as in the case of a monofunctional phenol or alcohol R'OH, then m=1. Where Z is water, or a glycol, m=2. Where Z is glycerol, m=3, etc.

In certain cases, it is advantageous to react alkylene oxides with the oxyalkylatable material in a random fashion so as to form a random copolymer on the oxyalkylene chain, i.e. the $[(OR)_n OH]_m$ chain such as

—AABAAABBABABBABBA—

In addition, the alkylene oxides can be reacted in an alternate fashion to form block copolymers on the chain, for example

—BBBAAABBBAAAABBBB— or

—BBBBAAACCCAAAABBBB— where A is the unit derived from one alkylene oxide, for example ethylene oxide, and B is the unit derived from a second alkylene oxide, for example propylene oxide, and C is the unit derived from a third alkylene oxide, for example, butylene oxide, etc. Thus, these compounds include terpolymers or higher copolymers polymerized randomly or in a block-wise fashion or many variations of sequential additions.

Thus, $(OR)_n$ in the above formula can be written $-A_a B_b C_c-$ or any variation thereof, wherein a, b, and c are 0 or a number provided that at least one of them is greater than 0.

It cannot be overemphasized that the nature of the oxyalkylatable starting material used in the preparation of the surfactant is not critical. Any species of such material can be employed. By proper additions of alkylene oxides, this starting material can be rendered suitable as a surfactant.

REPRESENTATIVE EXAMPLES OF Z

| No. | Z |
|---|---|
| 1 | $\overset{O}{\underset{\|}{RC}}-O-$ |
| 2 | $R_n-\underset{}{\bigcirc}-O-$ |
| 3 | $R-O-$ |
| 4 | $R-S-$ |
| 5 | $\overset{O}{\underset{\|}{R-C}}-\overset{H}{\underset{\|}{N}}-$ |
| 6 | $\overset{O}{\underset{\|}{R-C}}-N<$ |
| 7 | $\overset{H}{\underset{\|}{R-N}}-$ |
| 8 | $RN<$ |
| 9 | Phenol-aldehyde resins. |
| 10 | $-O-$ (Ex. Alkylene oxide block polymers.) |
| 11 | $-O-\underset{}{\bigcirc}(R)-X-\underset{}{\bigcirc}(R)-O-$ <br> $X = -O-, -S-, -CH_2-\overset{O}{\underset{O}{S}}-$, etc. |
| 12 | $R-S-CH_2\overset{O}{\underset{\|}{C}}-O-$ |
| 13 | $RPO_4H-$ |
| 14 | $RPO_4<$ |
| 15 | $PO_4\equiv$ |
| 16 | $R_n-\underset{}{\bigcirc}-SO_2\overset{H}{\underset{\|}{N}}-$ |
| 17 | $R_n-\underset{}{\bigcirc}-SO_2N=$ |
| 18 | $\overset{O}{\underset{\|}{RC}}-\overset{H}{\underset{\|}{N}}-\underset{}{\bigcirc}-N<$ |
| 19 | Polyol-derived. (Ex.: Glycerol, glucose, pentaerythritol.) |
| 20 | Anhydrohexitan or anhydrohexide derived. (Spans and Tweens.) |
| 21 | Polycarboxylic derived. |

-continued

REPRESENTATIVE EXAMPLES OF Z

| No. | Z |
|---|---|
| 22 | —CHCH$_2$—O—<br>    |<br>    CH$_2$<br>    |<br>    amine |

Examples of oxyalkylatable materials derived from the above radicals are legion and these, as well as other oxyalkylatable materials, are known to the art. A good source of such oxyalkylatable materials, as well as others, can be found in "Surface Active Agents and Detergents," vol. 1 and 2, by Schwartz, et al., Interscience Publishers (vol. 1, 1949-vol. 2, 1958) and the patents and references referred to therein.

Other types of surfactants beside non-ionic surfactants such as of the oxyalkylated type such as anionic, cationic, ampholytic, etc., provided they perform their function herein, such as for example, those of the carboxylate, sulfate, sulfonate, etc., type such as for example alkanesulfonates, alkaryl sulfonates, etc.

As is quite evident, new surfactants will be constantly developed which could be useful in our invention. It is therefore not only impossible to attempt a comprehensive catalogue of such surfactant, but to attempt to describe the invention in its broader aspects in terms of specific chemical names of its components used would be too voluminous and unnecessary since one skilled in the art could by following the testing procedures described herein select the proper agent. This invention lies in the use of suitable surfactants in this invention and their individual composition is important only in the sense that their properties can effect their use. To precisely define each specific surfactant useful herein in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of suitable surfactants. In analogy to the case of a machine wherein the use of certain materials of construction or dimensions of parts would lead to no practical useful result, various materials will be rejected as inapplicable where others would be operative. One can obviously assume that no one will wish to make a useless composition or will be misled because it is possible to misapply the teachings of the present disclosure in order to do so. Thus, any surfactant that can perform the demulsification function stated herein can be employed.

In the present process, we have found that volumetric ratios of demulsifying agent to oil of between 1:20,000 and 1:200,000 are adequate, most oils being satisfactorily treated at ratios between 1:30,000 and 1:50,000. We have operated with chemical ratios greater than about 1:200,000.

Other aids to demulsification besides chemical demulsifiers can be employed in resolving these emulsions or can be employed in conjunction with chemical demulsifiers such as centrifuges, or high voltage electric field, etc. The use of an electric field is illustrated in the following patents:

U.S. Pat. No. 3,582,489
U.S. Pat. No. 3,252,884
U.S. Pat. No. 3,701,723.

We have now discovered that emulsions can be broken more effectively by treating the emulsion with hydrocarbon polymers or copolymers in combination with demulsifiers. The use of the hydrocarbon polymer-demulsifier combination is more effective in demulsification than is achieved by the use of demulsifiers alone. The process is particularly effective in desalting oils. One special aspect of the effectiveness of the process is its greater efficiency in separating oil from the effluent water.

A wide variety of hydrocarbon polymers and copolymers can be employed in this invention. In general, the hydrocarbon polymers and copolymers employed are soluble in the oily phase.

The following Table illustrates representative, non-limiting hydrocarbon polymers and copolymers.

TABLE 1

| | |
|---|---|
| Polypropylene | Polyethylene |
| Ethylene-propylene copolymer | Polybutene |
| Polyisobutylene | Polypentene |
| Polybutadiene | Ethylene-vinyl ester copolymer |
| Ethylene-vinyl copolymer | Styrene-butadiene copolymer |
| Polystyrene | Polycyclopentylethylene |
| Polydienes (substituted & unsubstituted) | Polycyclohexylethylene |
| Poly (phenylacetylene) | Polycyclohexenalkenes |
| Styrene-butadiene copolymer | Polycyclopentene |
| Polymethylene | |

In addition, copolymers which contain other elements beside carbon and hydrocarbon can be employed such as acrylic-type monomers, for example acrylonitrile, etc.

The preferred hydrocarbon polymer is a polyalkylene polymer.

In general, the hydrocarbon polymers are polymers and copolymers of unsaturated, (especially olefinic), materials.

The molecular weight range of the hydrocarbon polymer or copolymer may vary widely such as a molecular weight of at least about 300, such as from about 300 to 500,000, for example from about 5,000 to 200,000, preferably from about 5,000 to 100,000 with an optimum of 10,000 to 50,000. The optimum amounts of hydrocarbon polymer employed will be dependent on the particular hydrocarbon polymer, the system treated, the demulsifier employed, the condition.

One aspect of this invention involves the desalting of petroleum products employed in gas turbines and related equipment.

Petroleum products such as crude oils and residual oils contain sufficient amounts of sodium (>1 ppm) and vanadium (>1 ppm) to be corrosive to nickel alloys used as turbine blades in gas turbines designed for burning these oils. Since sodium is present in the oils as a water soluble salt and vanadium is present in the form of a water insoluble metallo-porphyrin complex, it is conventional practice when using these oils as fuel for gas turbines to extract the sodium from the fuel with water. Vanadium is inhibited in a separate step which will not be discussed herein.

In order to extract the sodium salts with water, the petroleum product is thoroughly mixed with a given percent of water (5–10%) and the resultant fuel/water emulsion is separated into the water and oil phases by means of a settling tank, electrostatic precipitator or centrifuge. Chemical demulsification aids are used in these processes to obtain the appropriate separation of phases. The chemical demulsifier requirements for the centrifugal and electrostatic water washing processes are similar. The invention will be illustrating the electrostatic process.

One of the problems involved in the desalting of such oils is the fact the water effluent from the electrostatic treatment of the desalting emulsion contains entrained oil due to the incomplete separation of oil from the water phase. Conventional demulsifiers have not been able to eliminate this problem even at concentrations in the oil above 2500 ppm. Thus, oil entrainment by the effluent water is a persistent problem in the desalting of these oils.

The amount of demulsifier employed will vary depending on various factors such as the particular demulsifier, the oil treated, the conditions of treatment, etc. In general, the amount of demulsifier employed is about 1 to 20,000 ppm of oil such as about 10 to 2500 ppm of oil, for example from about 10 to 1000 ppm, but preferably about 20 to 500 ppm.

The amount of hydrocarbon polymer will also vary depending on the particular hydrocarbon polymer, the particular demulsifier, the particular oil, the conditions of treatment, etc. In general, one employs the hydrocarbon polymer in concentration from about 5 to 100,000 ppm of oil, such as from about 100 to 20,000 ppm, for example from about 100 to 10,000 ppm, but preferably from about 1,000 to 5,000 ppm.

The following test examples are presented for purposes of illustration and not of limitation. The test examples were carried out as follows.

A given oil was continuously charged to an electrostatic coalescer designed to simulate operating conditions (e.g. pressure, temperature and mixing intensity) of commercial electrostatic coalescers. Fresh water was injected into the oil stream in a ratio of 90:10 oil-water (by volume). The oil and water were then thoroughly mixed to form an oil/water emulsion which passed into the electrostatic coalescer for resolution into component oil and water phases. The clean oil was drawn out of the top of the coalescer and the effluent water from the bottom.

In order to evaluate of effectiveness of hydrocarbon polymers on enhancing the resolution of the oil/water emulsion, two different runs were conducted for each polymer studied. In the first run, a commercial chemical demulsifier was injected into the oil stream (the amount injected depending upon the oil being utilized) ahead of the water injection. The (oil-demulsifier)/water emulsion was then passed into the coalescer for resolution as described above. In the second run, the hydrocarbon polymer under study was injected into the oil stream along with the chemical demulsifier used in the first experiment (the same concentration of demulsifier in the oil stream was used in both experiments). The (oil-demulsifier-polymer)/water emulsion was passed into the coalescer for resolution as mentioned above. Samples of the product oil from both experiments were collected and analyzed for sodium and BS&W contents (sodium contents and BS&W values were used to monitor degree of success of the coalescence process). The results of these analyses from the two experiments were compared with each other in order to assess the effects of the polymer on the electrostatic coalescer resolution of the emulsion. In addition to these analyses, the amount of oil entrained in the effluent water during each experiment was determined at various levels within the effluent water phase of the coalescer. These results from each experiment were also compared with one another in order to determine what effect the polymer had on oil entrainment in the effluent water.

The results are presented in the following table. In oil content of effluent water Sample 1 was taken closest to oil/water interface, 2 and 3 further below o/w interface in sequence and 4 a sample of the BS&W.

TABLE II

RESULTS OF ELECTROSTATIC WATER WASHING OF RESIDUAL FUELS
High Mix, 265° F., 10% Wash Water

| Treating Compound | ppm demulsifier | ppm hydrocarbon polymer | % Na Removed | Oil Content Effluent H$_2$O | | | |
|---|---|---|---|---|---|---|---|
| | | | | 1 | 2 | 3 | BS & W |
| Demulsifier (DA) | 800 | 0 | 89.1 | 10,000 | 1000 | 1000 | 0.77 |
| Polypropylene + DA | 800 | 1000 | 93.7 | 300 | 300 | 300 | 0.46 |
| Ethylene-propylene + DA | 800 | 1000 | 96.2 | 300 | 300 | 50 | 0.23 |
| Polyisobutylene + DA | 800 | 1000 | 97.3 | 300 | 300 | 100 | 0.16 |

High Mix, 275° F., 10% Wash Water

| Treating Compound | ppm Demulsifier | ppm hydrocarbon polymer | % Na Removed | Oil Content Effluent, H$_2$O | | | |
|---|---|---|---|---|---|---|---|
| | | | | 1 | 2 | 3 | BW & W |
| Demulsifier (DB) | 500 | 0 | 95.8 | 3000 | 2000 | 150 | 0.41 |
| Polypropylene + DB | 500 | 1500 | 97.9 | 10 | 10 | 10 | 0.28 |

Physical properties of hydrocarbon polymers employed in TABLE II are as follows:

TABLE III

| | Physical Properties | |
|---|---|---|
| Hydrocarbon Polymer | Ave. MW | Viscosity (cps at 375° F.) |
| Polypropylene | Not available | 5,000 |
| Ethylene-propylene copolymer | 164,000 | 310,000 |
| Polyisobutylene | 50,000 | <5,0000 |

Demulsifier DA & DB are mixtures of (1) oxyethylated butyl/nonyl phenol-formaldehyde resin (1 part by wgt. of resin to 0.4 parts of wgt. of EtO) and (2) oxyethylated-oxypropylated butyl phenol-formaldehyde resin (1 part by weight of resin to 24 parts of wgt. of EtO and 46 parts by weight of PrO).

In DA the weight ratio of (1) to (2) is 0.2 and in DD the weight ratio of (1) to (2) is 1.8.

The following is obvious from Table II:

(1) The addition of the hydrocarbon polymer greatly reduces the oil content in the effluent water, in one case by a factor of 300.

(2) The hydrocarbon polymer leaves only 3% of the sodium in the product fuel versus the demulsifier without the hydrocarbon polymer which leaves 11% of the sodium in the product fuel (a factor of reduction ~4.)

(3) The BS&W in the product fuel is reduced by a factor of 4 in comparision to the demulsifier without the hydrocarbon polymer.

Thus, the invention
(1) suppresses the oil content of effluent water
(2) enhances sodium removal
(3) reduces BS&W In addition to treating residual gas turbine fuel, the process can also be applied to the other systems described above, including crude and heavy oils, tertiary recovery oil, tar sand, shale oil, coal derived liquids, etc.

We claim:

1. A demulsifier composition comprising 1 to 20,000 parts of an oxyalkylated alkyl phenol-aldehyde resin and 5 to 100,000 parts of a hydrocarbon polymer or copolymer having a molecular weight of from 10,000 to 50,000.

2. The composition of claim 1 where the oxyalkylated alkyl phenol-aldehyde resin is oxyethylated butyl/nonyl phenol-formaldehyde.

3. The composition of claim 2 where the hydrocarbon polymer is a polyalkylene.

4. The composition of claim 3 where the polyalkylene is polyethylene, polypropylene, poly(ethylene-propylene), or polyisobutylene.

5. A process of demulsification which comprises treating an emulsion with a demulsification composition comprising 1 to 20,000 parts of an oxyalkylated alkyl phenol-aldehyde resin and 5 to 100,000 parts of a hydrocarbon polymer or copolymer having a molecular weight of from 10,000 to 50,000.

6. A process of demulsification which comprises treating an emulsion with the composition of claim 2.

7. A process of demulsification which comprises treating an emulsion with the composition of claim 3.

8. A process of demulsification which comprises treating an emulsion with the composition of claim 4.

9. The process of claim 5 where the oxyalkylated alkyl phenolaldehyde resin is present in a concentration of 20 to 500 ppm of oil in the emulsion and the hydrocarbon polymer is present in a concentration of 1,000 to 5,000 ppm of oil in the emulsion.

10. The process of claim 5 where the phenol-aldehyde resin is oxyethylated butyl/nonyl phenol-formaldehyde present in a concentration of 800 ppm of oil in the emulsion and the hydrocarbon copolymer is an ethylene-propylene copolymer having a molecular weight of 164,000 and is present in a concentration of 1,000 ppm of oil in the emulsion.

11. The process of claim 5 where the phenol-aldehyde resin is oxyethylated butyl/nonyl phenol aldehyde resin present in a concentration of 800 ppm of oil in the emulsion and the hydrocarbon polymer is polyisobutylene having a molecular weight of 50,000 and is present in a concentration of 1,000 ppm of oil in the emulsion.

* * * * *